United States Patent [19]
Bradley

[11] Patent Number: 5,505,557
[45] Date of Patent: Apr. 9, 1996

[54] GEOTEXTILE CONTAINER

[75] Inventor: Anthony S. Bradley, Valparaiso, Fla.

[73] Assignee: Bradley Industrial Textiles, Inc., Valparaiso, Fla.

[21] Appl. No.: 343,119

[22] Filed: Nov. 22, 1994

[51] Int. Cl.[6] .......................................... F02B 3/04
[52] U.S. Cl. ................................ 405/15; 383/121; 405/18
[58] Field of Search ................................. 405/15, 18, 16, 405/21; 383/37, 38, 40, 121

[56] References Cited

U.S. PATENT DOCUMENTS 3,886,751   6/1975   Porraz Jimenez Labor ......... 405/18 X Primary Examiner—Ramon S. Britts
Assistant Examiner—Frederick L. Lagman
Attorney, Agent, or Firm—Dority & Manning

[57] ABSTRACT

An improved geotextile container of the type for maintaining fill material. An end portion of the container is constructed to give enhanced strength when compared with the seamed ends in prior designs. Specifically, the closed end of the container is back-folded into the inner cavity to form a pouch. At least one anchor object is positioned in the pouch and tied off by a clamping mechanism situated about a neck portion of the pouch. As a result, the pouch is closed and the anchor object is maintained on the inside thereof. Due to this construction, an axially outward force imparted by the fill material will be directed against the inner surface of the bag instead of directly against the closed end. Various embodiments of this construction may also be used to interconnect small geotextile bags such that a larger container of a desired length may be constructed.

29 Claims, 8 Drawing Sheets

GEOTEXTILE CONTAINER

BACKGROUND OF THE INVENTION

The present invention relates to the art of geotextile containers of the type for maintaining fill material.

Geotextile containers adapted to serve as receptacles for soil, aggregate or other fill material are utilized in a variety of applications. For example, elongated geotextile containers are often utilized in a body of water, such as a bay or a river, to facilitate control of erosion. In a typical application, an elongated container of this type may be situated to extend generally in parallel, perpendicular or at various angles with respect to the shoreline. Such a container may be filled with material dredged from the bottom of the body of water to provide weight to maintain the container in position. The area between the container and the shoreline may be back-filled with soil to effectively extend the shoreline farther out into the body of water. Containers of this type may also be used as a receptacle for contaminated material.

In the prior art, each end of an elongated geotextile container has often been simply sewn shut to form a seam. When filled, the weight of the fill material tends to push against the seamed end. As a result, the seams generally become a weak part of the structure.

The weight and size of the container itself also will often present a significant problem. For example, an elongated geotextile container of this type may have a length of up to about 2,000 feet or more. The circumference will generally depend on the desired barrier height, but a circumference of about forty-five (45) feet or more is also not unusual. The dry weight of the largest of such a container may exceed eight (8) tons. As a result, these containers have often been difficult to manufacture, transport and install.

SUMMARY OF THE INVENTION

The present invention recognizes and addresses the foregoing disadvantages, and others, of prior art constructions and methods. Accordingly, it is an object of the present invention to provide an improved geotextile container.

It is another object of the present invention to provide an improved geotextile container which has enhanced end strength when compared with containers of the prior art.

It is another object of the present invention to provide an improved geotextile container constructed of a plurality of smaller geotextile bags.

It is a more particular object of the present invention to provide an improved geotextile container which is less difficult to maintain in position during filling than a prior art container.

It is also a more particular object of the present invention to provide an improved geotextile container constructed of indeterminate length which may be selectively expanded.

It is a further object of the present invention to provide an improved method of reinforcing a closed end of a tubular geotextile bag.

It is a further object of the present invention to provide methods of interconnecting at least two tubular geotextile bags.

Some of these objects are accomplished by a container of the type for maintaining fill material. The container comprises a bag defining an inner cavity to permit the fill material to be contained therein. The bag is constructed of a flexible material and has at least one closed end. The closed end is back-folded into the inner cavity to form a pouch. An outer surface of the bag thus defines an inner surface of the pouch. Likewise, an inner surface of the bag defines an outer surface of the pouch.

At least one anchor object is positioned in the pouch and tied off by a clamping mechanism situated about a neck portion of the pouch. As a result, the pouch is closed and the anchor object is maintained on the inside thereof. Due to this construction, an axially outward force imparted by the fill material will be directed against the inner surface of the bag instead of directly against the closed end.

In presently preferred embodiments, the bag is a tubular geotextile container. The closed end of such a container is typically a seamed end thereof, such as an end which has been closed by stitching. In some exemplary constructions, the at least one anchor object maintained in the pouch may be one or more ball-shaped objects. In other exemplary constructions, one or more tires may be utilized. For example, worn automobile tires may be utilized for this purpose.

In some exemplary constructions, a plurality of anchor objects are individually tied off to form an anchor assembly. The anchor assembly itself is then further tied off by a clamping mechanism. Again, the individual anchor objects utilized in the anchor assembly may be ball-shaped objects or tires.

Other objects of the invention are achieved by a geotextile container comprising at least two tubular geotextile bags. Each such bag defines an inner cavity to permit fill material to be contained therein. A portion of a first bag is back-folded into its respective inner cavity to form a pouch. An inner surface of the pouch is thereby defined by an outer surface of the first bag and an outer neck portion of the pouch is defined by an inner surface of the first bag.

In some exemplary constructions, at least one anchor object is positioned in the respective inner cavity of the second bag. The anchor object and a portion of the second bag may be situated in the pouch of the first bag. A clamping mechanism, such as a strap, is situated about the outer neck portion of the pouch such that the pouch is closed. The anchor object is thereby tied off and maintained inside the pouch. As a result, an object-and-socket connection is formed such that the first bag and the second bag are connected together.

In other exemplary constructions, a portion of the second bag is also back-folded into its respective inner cavity to form a pouch. Thus, an inner surface of this pouch is defined by an outer surface of the second bag. An outer neck portion of this pouch is defined by an inner surface of the second bag.

An interconnecting member may be provided having first and second anchor objects at opposite ends thereof. These first and second anchor objects are situated in the respective pouches defined in the first bag and the second bag. The anchor objects are maintained in each such pouch utilizing first and second clamping mechanisms situated about respective outer neck portions. As a result, respective object-and-socket connections are formed to connect the bags together via the interconnecting member.

Other objects of the invention are achieved by a method of reinforcing a seamed end of a tubular geotextile bag of the type having an inner cavity for maintaining fill material. The method comprises the step of folding a seamed end of the bag back into its inner cavity. This step forms a pouch such that an inner surface of the bag will define an outer neck portion of the pouch. Another step involves placing at least one anchor object into the pouch. As an additional step, a clamping mechanism is situated about the neck portion. Further, the clamping mechanism is tightened to close the pouch and tie off the anchor object such that the anchor object is maintained therein. Fill material may then be inserted into the inner cavity, whereby an outward force imparted on the bag by the fill material will be directed against an inner surface of the bag instead of a seam of the seamed end.

Objects of the invention are also achieved by a method of interconnecting at least two tubular geotextile bags of the type having an inner cavity for maintaining fill material. This method includes the step of folding a closed end of a first bag back into a respective inner cavity thereof to form a pouch. As an additional step, at least one anchor object is placed into a respective inner cavity of a second bag. Further, the anchor object with a portion of the second bag on an outside thereof is inserted into the pouch such that a remaining portion of the second bag will extend from the pouch. Another step involves situating a clamping mechanism about a neck portion of the pouch in the respective inner cavity of the first bag. Additionally, the clamping mechanism is tightened to close the pouch and tie off the anchor object such that it is maintained therein. As a result, the first bag and the second bag will be interconnected. Fill material may then be inserted into the respective inner cavities of each of the first bag and the second bag.

In another method of the invention, an interconnecting member is provided having respective first and second anchor objects at opposite ends thereof. In this case, a closed end of the second bag is also back-folded into a respective inner cavity thereof to form a pouch. One method step involves inserting the first anchor object into the pouch of the first bag. Another step involves inserting the second anchor object into the pouch of the second bag. A respective clamping mechanism is situated about the outer neck portion of each pouch and tightened such that the respective anchor object is maintained therein. As a result, the first bag and the second bag will be interconnected.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
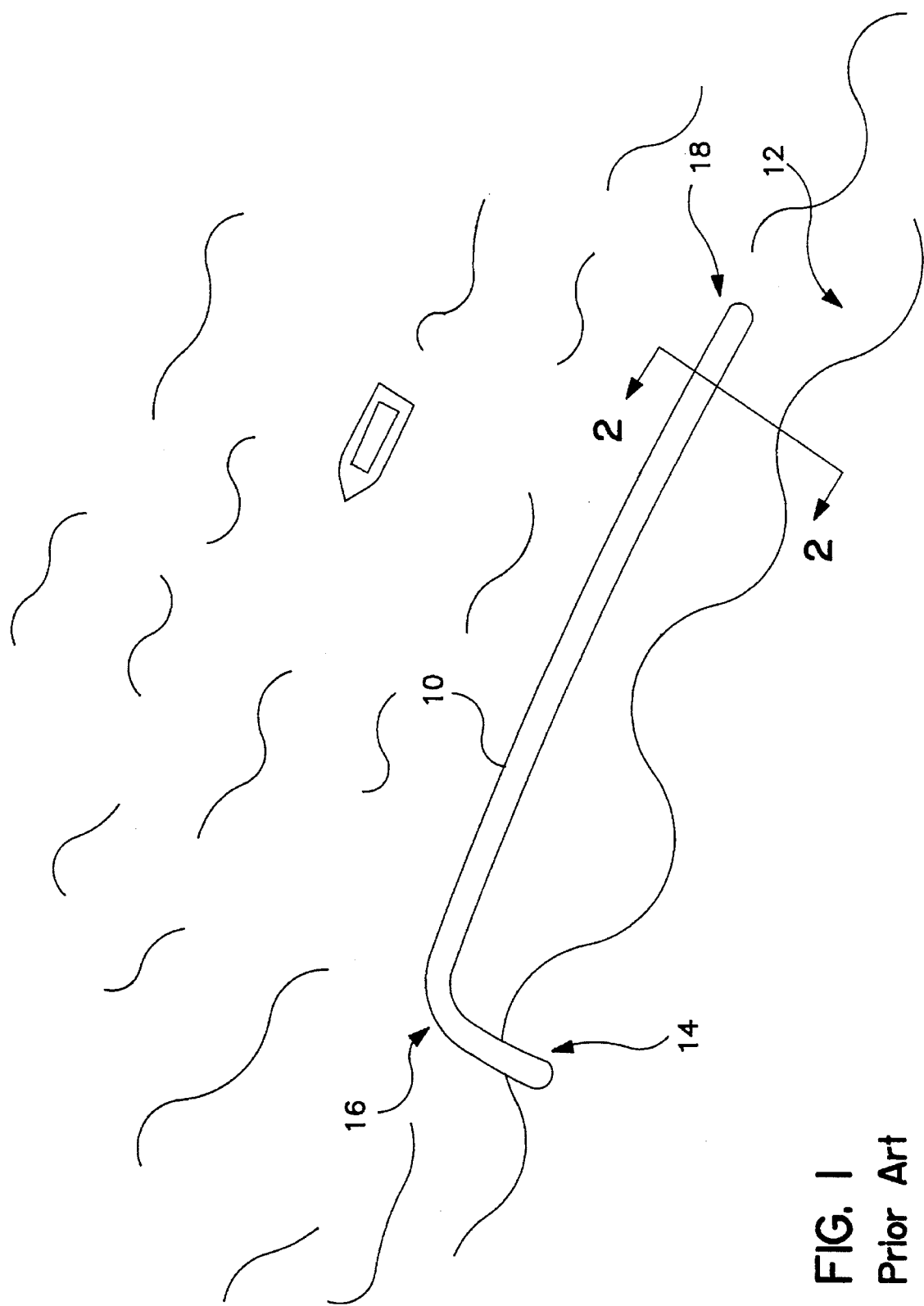
FIG. 1 is an aerial view illustrating an elongated geotextile container of the prior art being utilized in a typical application.

Repeat use of reference characters in the present specifications and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Although the prior art has been described generally above, the present invention may be most easily explained if prior art teachings are discussed in greater detail. Thus, referring now to FIG. 1, a prior art geotextile container 10 is illustrated in use in a typical application. Specifically, container 10 is being used in this case to control erosion of a shoreline indicated generally at 12. A first end portion 14 of container 10 is situated on the bank forming shoreline 12 as shown. From this location, container 10 extends into the body of water and curves, as indicated at 16. From this curve, container 10 extends in a direction substantially parallel to shoreline 12, terminating at its second end portion 18. As noted, geotextile containers of this type may have a length of about 2,000 feet or more. Again, the circumference of a container such as container 10 depends on the desired barrier height, but may be about forty-five (45) feet or more. Alternatively, a desired barrier height may be achieved by stacking several such containers in a pyramid arrangement.

Figure 2:
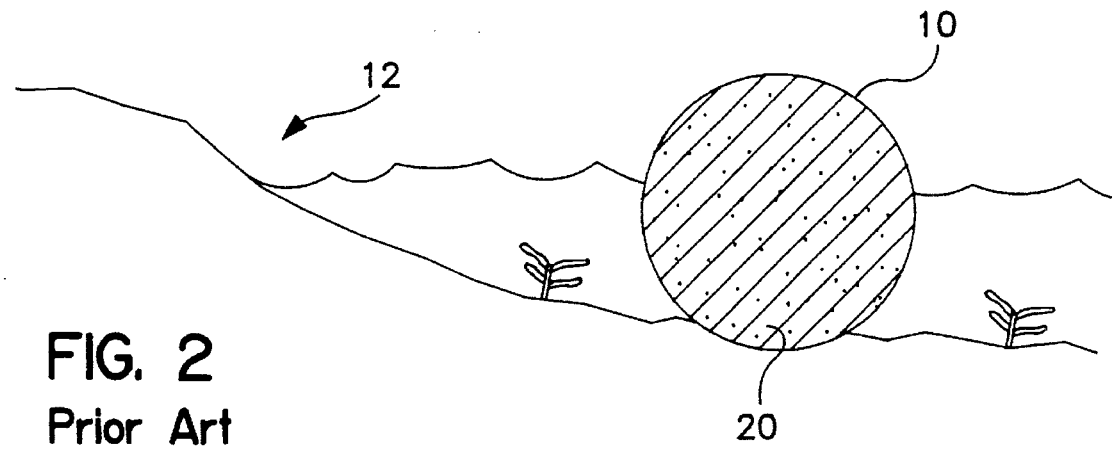
FIG. 2 is a partial cross-sectional view as taken along lines 2—2 of FIG. 1.
Figure 3:
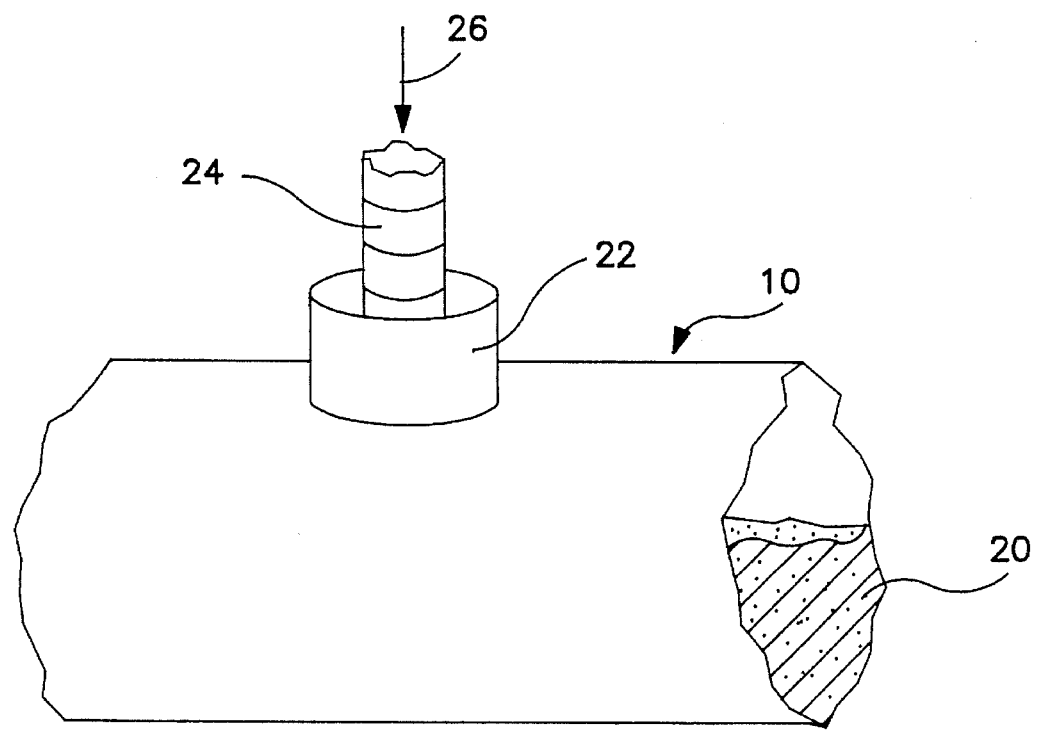
FIG. 3 is a perspective view of a portion of the geotextile container of FIG. 1 illustrating the manner by which fill material may be inserted therein.

Referring now to FIG. 2, container 10 is typically filled in use with soil or aggregate material, such as that indicated at 20. The frequently enormous weight of this material serves to securely maintain container 10 against the floor of the body of water. Because of its position, container 10 will serve as an erosion barrier for the portion of shoreline 12 in front of which it is situated. Often, it will be desirable to backfill the area between container 10 and shoreline 12 with soil or other suitable material so that shoreline 12 may be effectively extended out to the location of container 10.

Material 20 is typically inserted into container 10 at the time of installation. In other words, container 10 is generally manufactured at an appropriate facility and shipped unfilled to the location where it will be installed. To facilitate insertion of material 20, container 10 is typically equipped with a fill chimney, such as that indicated at 22. Typically, material 20 is fed through a pipe 24 (as indicated by the arrow 26) which has been inserted into chimney 22 as shown. Often, pipe 24 will extend to a dredge ship which dredges material 20 from the floor of the body of water.

Due to its length, container 10 may be difficult to fill. These difficulties are especially pronounced if currents in the body of water are relatively strong. Often, the empty portions of container 10 will tend to move in response to such currents. Additionally, the length of container 10 makes its overall weight very high, even when unfilled. As mentioned above, the unfilled weight of such a container may often exceed eight (8) tons. Transporting a container of this size and weight from the manufacturing facility to the installation location is often very difficult.

Figure 4A:
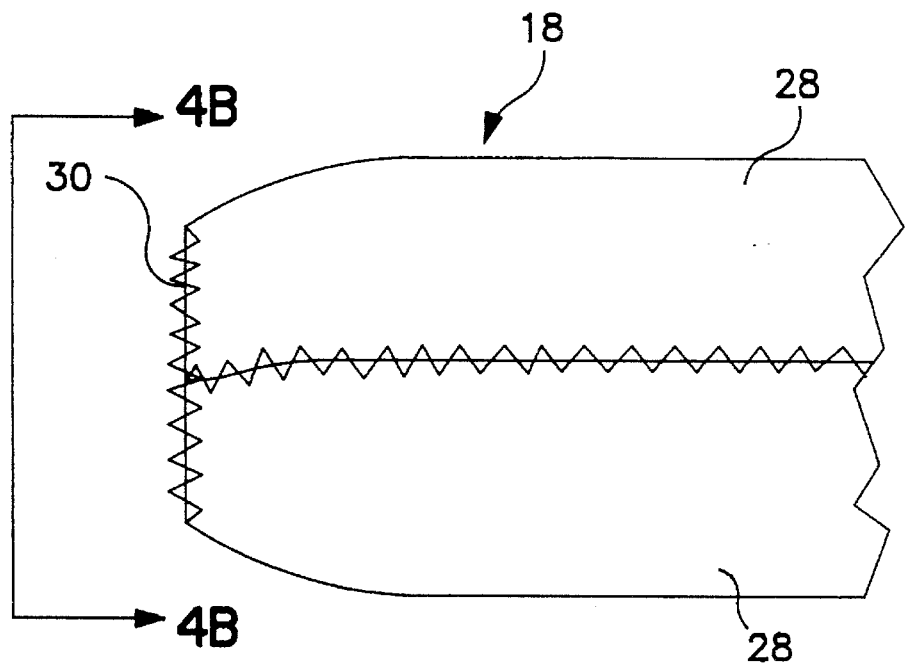
FIG. 4A is an elevational view of an end portion of the geotextile container of FIG. 1.
Figure 4B:
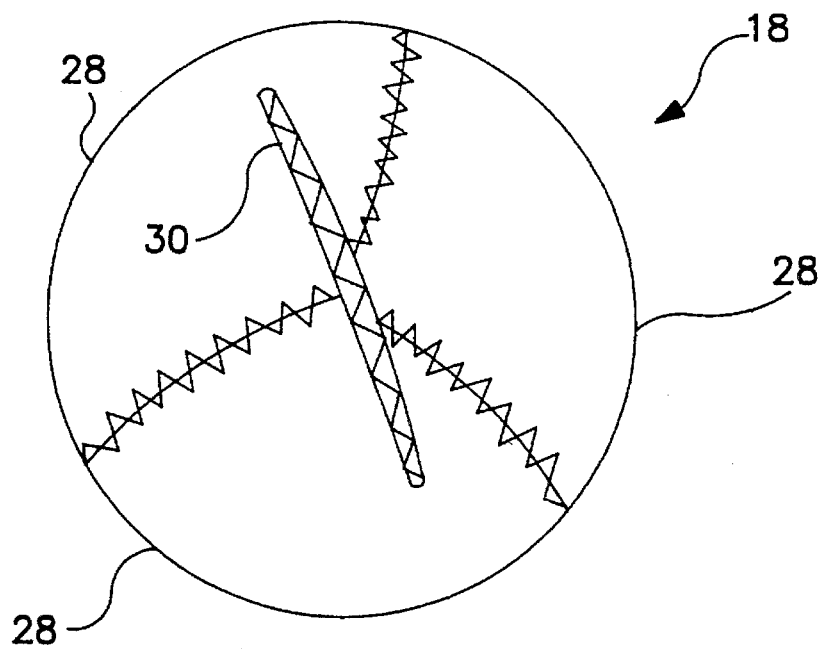
FIG. 4B is an end view of the geotextile container of FIG. 1 as taken along lines 4B—4B of FIG. 4A.

FIGS. 4A and 4B illustrate an enlarged view of end portion 18 of container 10. Although for purposes of simplicity only end portion 18 is shown, it should be understood that end portion 14 would typically be substantially identical. As can be seen, container 10 is typically constructed of a plurality of longitudinal strips 28 which have been stitched together along their adjacent edges. In the noted case in which container 10 has a circumference of about forty-five (45) feet, a prior construction has utilized three such strips, each having a width of about fifteen (15) feet.

As shown, the ends of strips 28 are typically brought together and stitched to form a seam 30. Although the stitching of seam 30 is relatively heavy, it should be appreciated that seam 30 may constitute a weak portion of the structure of container 10. Specifically, due to the elongated shape of container 10, shifting of material 20 therein will often occur in an axial direction. As a result, significant forces are directed against seam 30 from the inside of container 10 and the risk exists that these forces reach sufficient magnitude to cause seam 30 to open.

Geotextile containers constructed in accordance with the present invention will be described in the remainder of the specification. It will be appreciated that many conventional aspects of such containers will be similar to container 10. Thus, reference is made to the discussion above for an explanation of such conventional aspects.

Figure 5A:
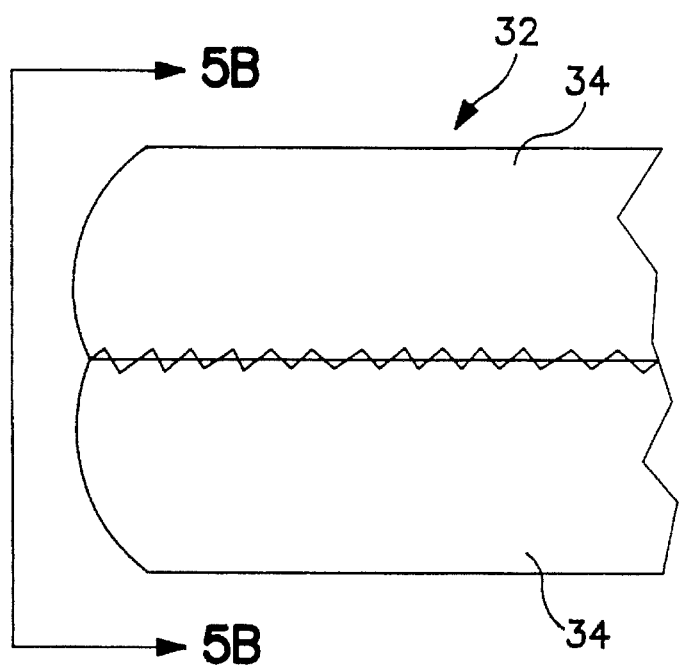
FIG. 5A is an elevational view of an end portion of a geotextile container constructed in accordance with the present invention.
Figure 5B:
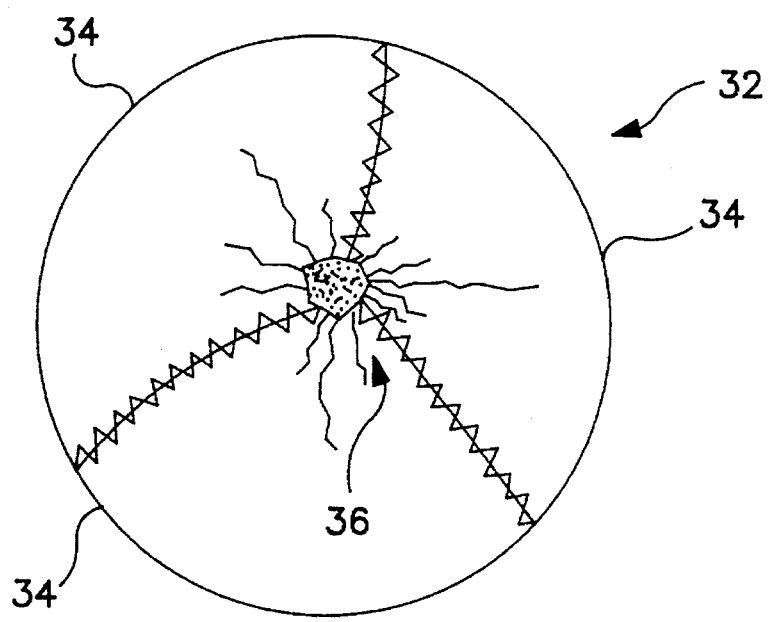
FIG. 5B is an end view of a geotextile container constructed in accordance with the present invention as taken along lines 5B—5B of FIG. 5A.

Referring now to FIGS. 5A and 5B, an end portion 32 of a geotextile container constructed in accordance with the invention is illustrated. As in the prior art, a container of the invention may also be constructed of a plurality of longitudinal strips, such as strips 34, which are stitched together along their adjacent edges. In a container of the invention, however, end portion 32 displays a navel 36 whereby the fabric of strips 34 can be seen extending back into the cavity of the container. As a result of this construction, which will be explained more fully below, axial forces imparted on the end of the container will be primarily directed against the fabric web of strips 34. Accordingly, end portion 32 will be less susceptible to the type of seam failure described above.

Figure 6A:
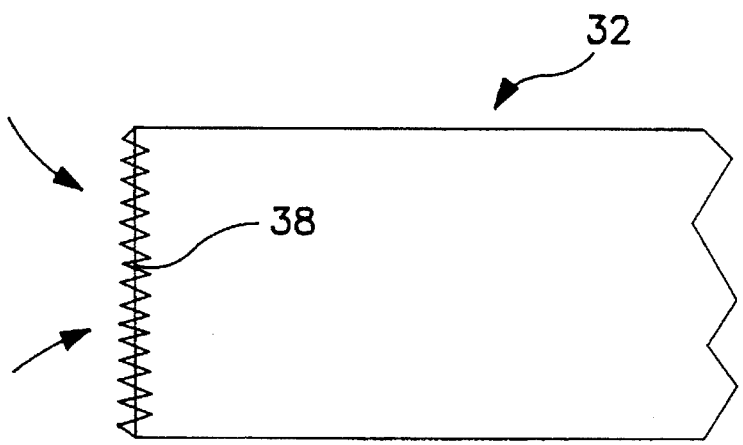
FIGS. 6A through 6C diagrammatically illustrate the manner in which an end portion of a geotextile container constructed in accordance with the present invention may be produced.
Figure 6B:
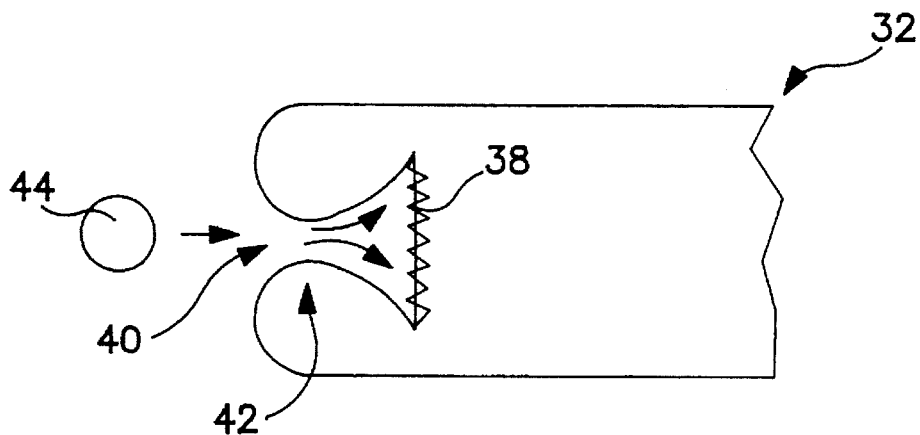
Figure 6C:
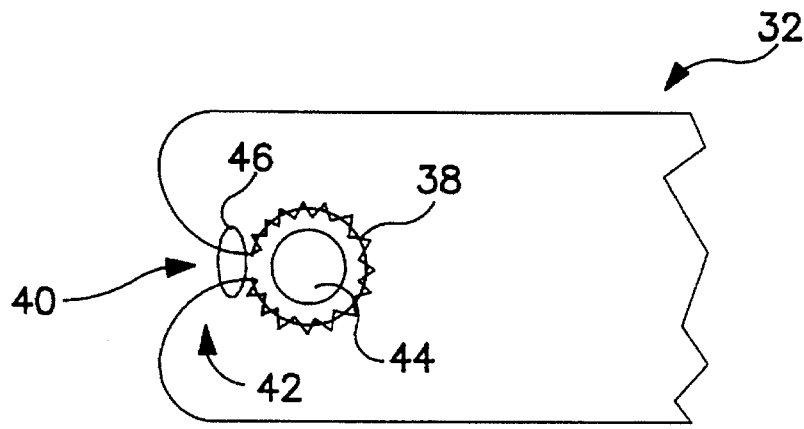

The manner by which the structure of end portion 32 may be produced is shown in FIGS. 6A through 6C, which are somewhat diagrammatic in nature for purposes of illustration. As can be seen in FIG. 6A, end portion 32 begins with a stitched seam 38 at its terminus similar to seam 30 of end portion 18. In this case, however, seam 38 is back-folded into the inner cavity of end portion 32, as can be seen in FIG. 6B. This defines a pouch 40 in end portion 32, as shown. Pouch 40 includes a neck portion generally indicated at 42 in which an outer surface thereof is defined by an inner surface of the fabric of end portion 32. The inner surface of neck portion 42 is therefore defined by an outer surface of this fabric.

An appropriate anchoring object, such as a large ball-shaped object 44, is then inserted into pouch 40. After object 44 is inserted into pouch 40, a suitable clamping mechanism (as indicated at 46) is wrapped about neck portion 42 and tightened. Clamping mechanism 46 may be any suitable type of strapping, cord, rope or the like. In exemplary constructions, seat belt strapping may be utilized for this purpose.

As a result of clamping mechanism 46, object 44 is tied off such that it will be maintained within pouch 40. It should be appreciated that material 20 will surround object 44 virtually about its entire spherical extent during filling. Thus, material 20 will actually serve to some extent to further maintain object 44 in position.

Figure 7:
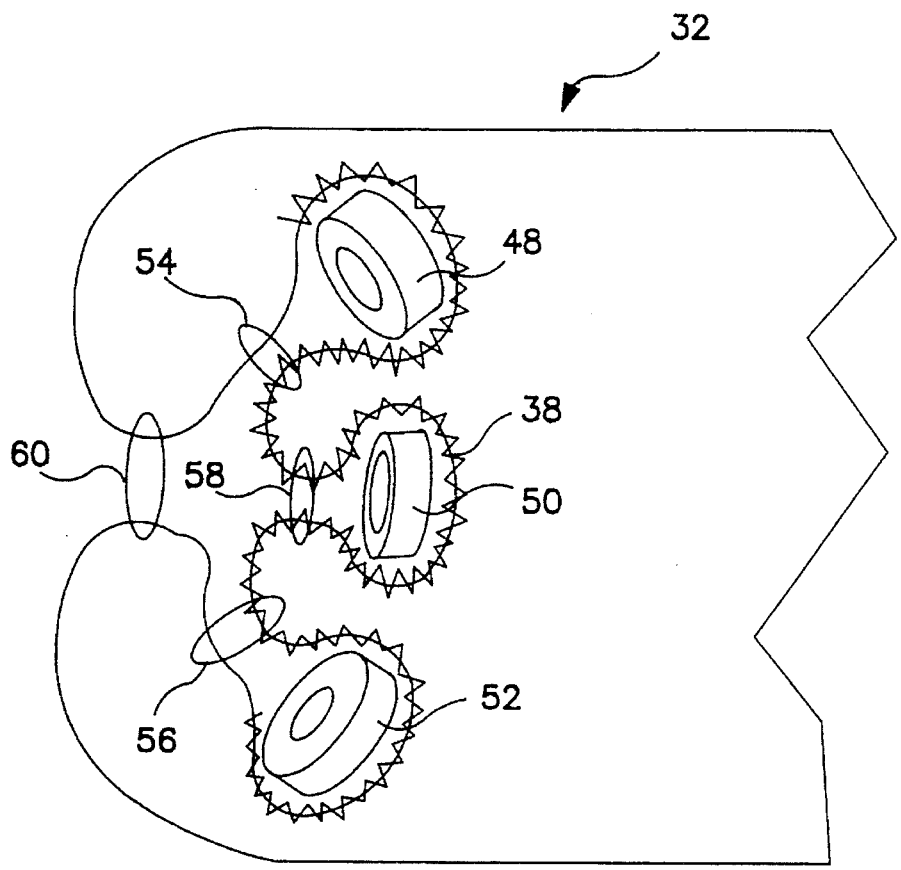
FIG. 7 is a diagrammatic view of an alternative anchor assembly which may be utilized to produce an end portion of a geotextile bag constructed in accordance with the present invention.

FIG. 7 illustrates a configuration in which a plurality of anchoring objects are utilized to form a single anchoring assembly. In this case, a plurality of tires 48, 50 and 52 are utilized as anchoring objects mainly for practical reasons. Specifically, worn tires are somewhat abundant and inexpensive. The use of worn tires in this application allows these tires to be reused in another productive capacity. It should be appreciated, however, that other types of objects, such as ball-shaped object 44, may also be utilized.

As shown, tire 48 is situated near one corner of stitched seam 38. Tire 48 is then tied off by an individual clamping mechanism, as indicated at 54. Similarly, tire 52 is situated at the opposite corner of stitched seam 38 and tied off by an individual clamping mechanism 56. Tire 50 is situated approximately in the middle of stitched seam 38 as shown, and also tied off by an individual clamping mechanism 58. The anchor assembly thus produced is then collectively tied off by clamping mechanism 60.

Figure 8:
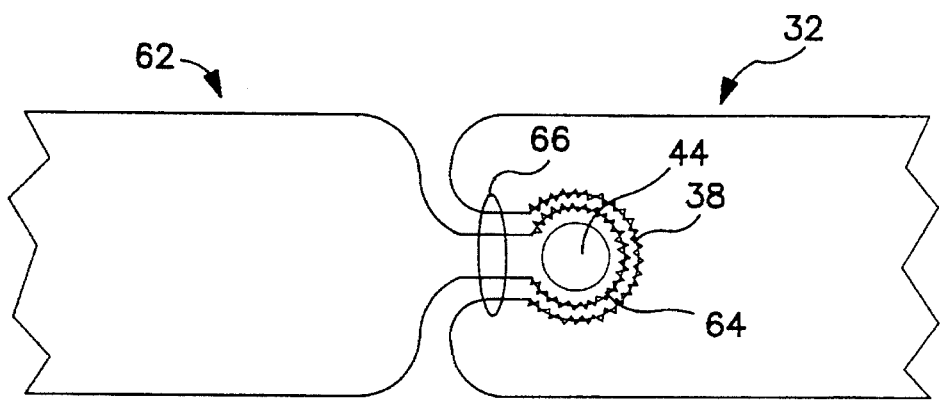
FIG. 8 is a diagrammatic view of the manner in which two geotextile bags may be interconnected in accordance with the present invention.

Referring now to FIG. 8, constructions of the invention may be utilized to not only enhance the strength of the end of one bag, but to also connect two bags together. For example, FIG. 8 illustrates end portion 32 connected to an opposite end portion 62 of another geotextile bag. As in the cases discussed above, stitched seam 38 is back-folded into the cavity of end portion 32. In this case, however, ball-shaped object 44 is first inserted into the inner cavity of end portion 62 and positioned such that it will be adjacent to stitched seam 64. Object 44 is then inserted into the pouch defined by bag 32 as shown. The assembly is secured using a clamping mechanism 66 to form an object-and-socket connection.

Figure 9:
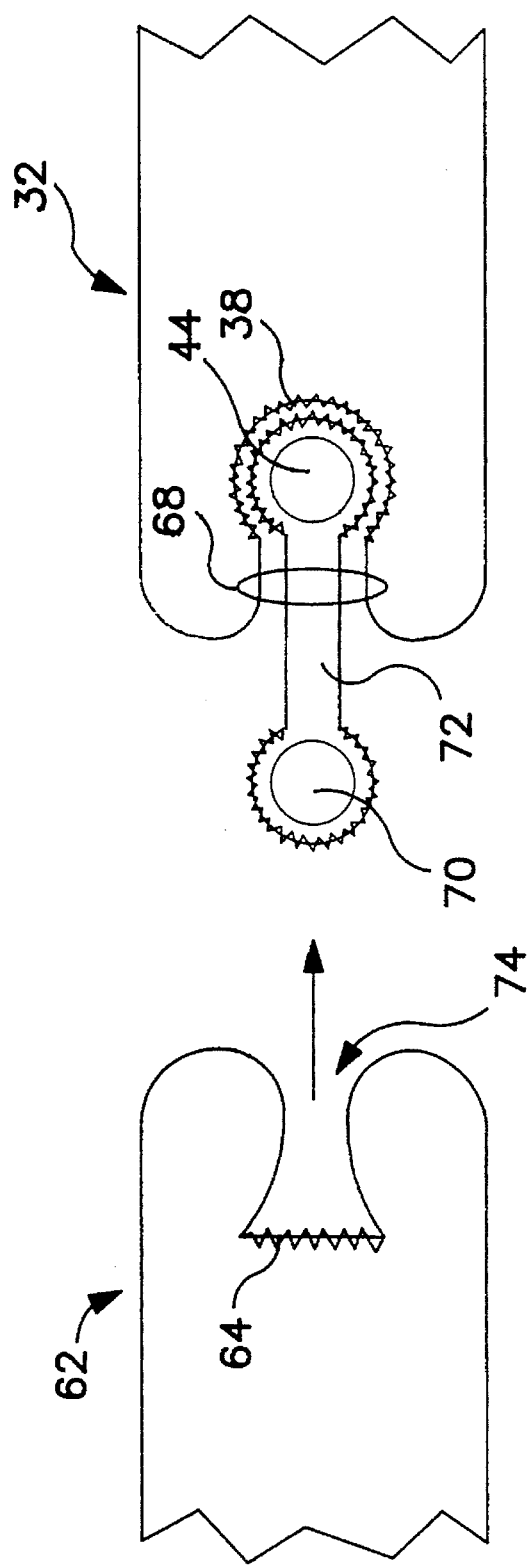
FIG. 9 is a diagrammatic view illustrating another manner in which two geotextile bags may be interconnected in accordance with the present invention.

Referring now to FIG. 9, a modified version of this object-and-socket connection is illustrated. As described above, ball-shaped object 44 is inserted in this configuration into end portion 32 and maintained by a clamping mechanism 68. In this case, however, ball-shaped object 44 is interconnected with another ball-shaped object 70 through member 72. Member 72 may be typically constructed of fabric, although it may also be constructed of a rigid material in some exemplary constructions. End portion 62 of the other bag is back-folded into its interior cavity to form a pouch 74. Ball-shaped object 70 is then inserted into pouch 74 and secured with a clamping mechanism to interconnect the bags having respective end portions 32 and 62.

Figure 10:
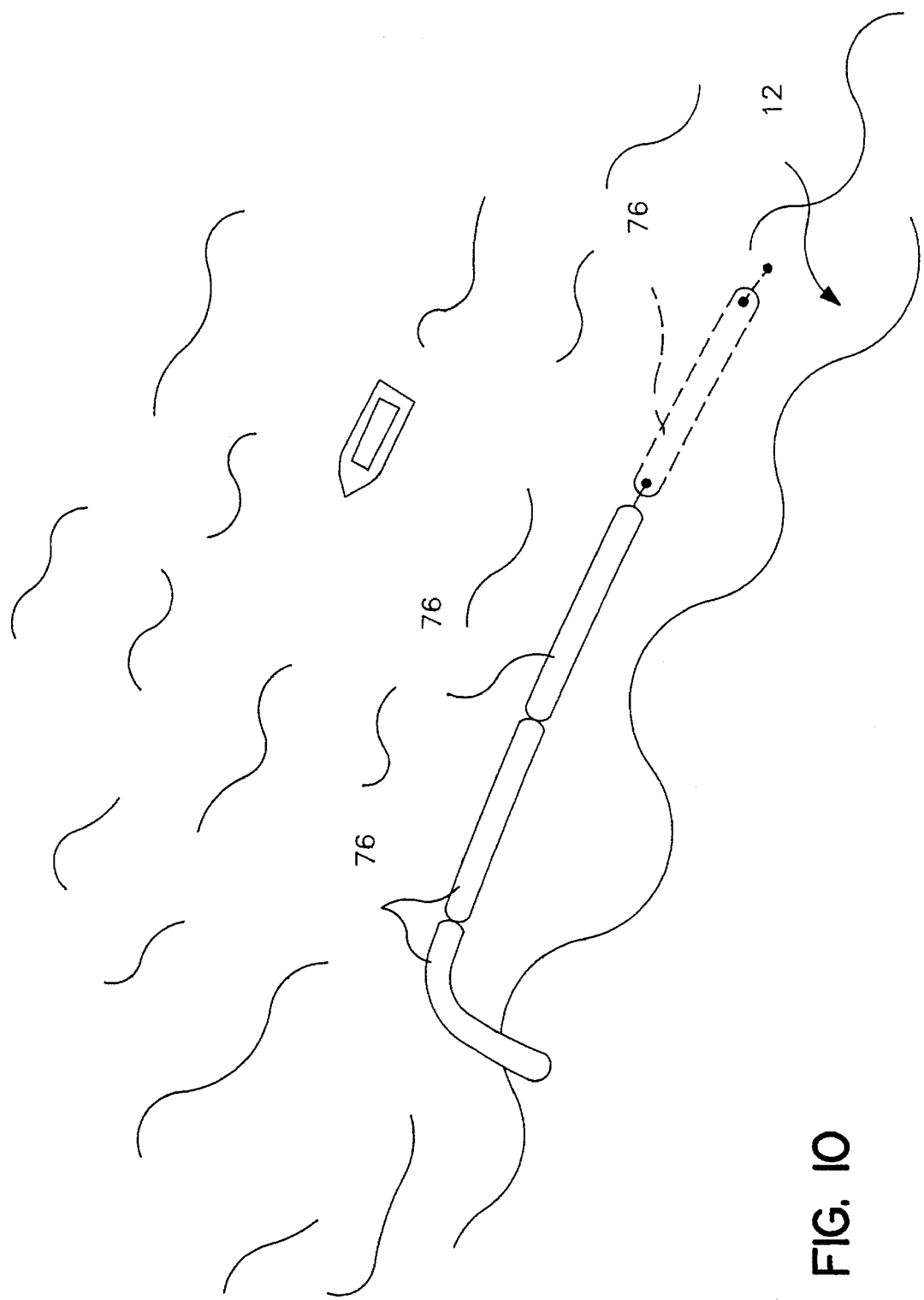
FIG. 10 is an aerial view somewhat similar to FIG. 1 illustrating a sectional geotextile container constructed in accordance with the present invention.

FIG. 10 illustrates a particular advantage of the configuration of FIG. 9. Specifically, this construction allows a geotextile container of indeterminate length to be constructed of multiple segments 76. Because each of such segments will be shorter than the overall container, they may be more easily maintained in position during the filling operation. A new segment may then be connected after the previous segment has been filled and is securely in position against the force of the currents. Additionally, further segments may be easily added in the future as desired.

Many modifications and variations to the present invention may be practiced by those of ordinary skill in the art, without departing from the spirit and scope of the present invention, which is more particularly set forth in the appended claims. In addition, is should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A container of the type for maintaining fill material, said container comprising:

a bag defining an inner cavity to permit the fill material to be contained therein, said bag constructed of a flexible material and having at least one closed end;

said closed end being back folded into the inner cavity to form a pouch, an inner surface of the pouch being defined by an outer surface of said bag;

at least one anchor object positioned in said pouch such that an inner surface of said bag will define an outer neck portion of said pouch; and a clamping mechanism situated about said outer neck portion of said pouch to close said pouch and tie off said anchor object such that said anchor object is maintained therein, whereby an outward force imparted on said bag by the fill material will be directed against the inner surface of said bag instead of said closed end.

2. A container as set forth in claim 1, wherein said bag is a tubular geotextile container.

3. A container as set forth in claim 2, wherein said closed end is a seamed end of said tubular geotextile container.

4. A container as set forth in claim 3, wherein said seamed end of said tubular geotextile container is a stitched end thereof.

5. A container as set forth in claim 1, wherein said at least one anchor object is a ball-shaped object.

6. A container as set forth in claim 1, wherein said at least one anchor object is a tire.

7. A container as set forth in claim 1, wherein said at least one anchor object comprises a plurality of anchor objects individually tied off to form an anchor assembly, said anchor assembly further being tied off by said clamping mechanism.

8. A container as set forth in claim 7, wherein respective of said plurality of anchor objects are tires.

9. A container as set forth in claim 1, wherein said at least one anchor object is situated inside of a second bag having a portion extending from said pouch to form an object-and-socket connection.

10. A container as set forth in claim 1, wherein said at least one anchor object is situated at one end of an interconnecting member having a second at least one anchor object at an opposite end thereof.

11. A container as set forth in claim 1, wherein said clamping mechanism is a strap.

12. A geotextile container for maintaining fill material, said container comprising:

at least two tubular geotextile bags each defining an inner cavity to permit the fill material to be contained therein;

a portion of a first bag of said at least two tubular bags being back folded into the respective inner cavity to form a pouch such that an inner surface of the pouch is defined by an outer surface of said first bag and an outer neck portion of said pouch is defined by an inner surface of said first bag;

at least one anchor object positioned in the respective inner cavity of a second bag of said at least two tubular bags, said anchor object and a portion of said second bag being situated in said pouch;

a clamping mechanism situated about said outer neck portion of said pouch to close said pouch and tie off said anchor object such that said anchor object is maintained therein, thereby forming an object and socket connection to connect said first bag and said second bag.

13. A container as set forth in claim 12, wherein said pouch is formed at a seamed end of said first bag and said at least one anchor object is positioned at an opposite seamed end of said second bag.

14. A container as set forth in claim 13, wherein said seamed end of said first and second bags are respective stitched ends thereof.

15. A container as set forth in claim 12, wherein said at least one anchor object is a ball-shaped object.

16. A container as set forth in claim 12, wherein said at least one anchor object is a tire.

17. A container as set forth in claim 12, wherein said clamping mechanism is a strap.

18. A geotextile container for maintaining fill material, said container comprising:

at least two tubular geotextile bags each defining an inner cavity to permit the fill material to be contained therein;

a portion of a first bag of said at least two tubular bags being back-folded into the respective inner cavity to form a first pouch such that an inner surface of said first pouch is defined by an outer surface of said first bag and an outer neck portion of said first pouch is defined by an inner surface of said first bag;

a portion of a second bag of said at least two tubular bags being back-folded into the respective inner cavity to form a second pouch such that an inner surface of the second pouch is defined by an outer surface of the second bag and an outer neck portion of said second pouch is defined by an inner surface of said second bag;

an interconnecting member having at least one first anchor object and at least one second anchor object located at respective opposite ends thereof, said first and second anchor objects being situated in respective of said first pouch and said second pouch;

first and second clamping mechanisms situated about respective outer neck portions of said first and second pouches such that the respective pouch is closed and the respective anchor object is tied off and maintained therein, thereby forming respective object-and-socket connections to connect said first bag and said second bag via said interconnecting member.

19. A container as set forth in claim 18, wherein each said pouch is formed at a seamed end of the respective bag.

20. A container as set forth in claim 19, wherein said seamed end of said first and second bags are respective stitched ends thereof.

21. A container as set forth in claim 18, wherein each of said anchor objects comprises a ball-shaped object.

22. A container as set forth in claim 18, wherein each of said anchor objects comprises a tire.

23. A container as set forth in claim 18, wherein each of said clamping mechanisms is a strap.

24. A method of reinforcing a seamed end of a tubular geotextile bag of the type having an inner cavity for maintaining fill material, said method comprising the steps of:

(a) folding a seamed end of said bag back into said inner cavity to form a pouch such that an inner surface of said bag will define an outer neck portion of said pouch;

(b) placing at least one anchor object into said pouch;

(c) situating a clamping mechanism about said neck portion;

(d) tightening said clamping mechanism to close said pouch and tie off said anchor object such that said anchor object is maintained therein.

25. A method as set forth in claim 24, further comprising the step of inserting the fill material into the inner cavity, whereby an outward force imparted on said bag by the fill material will be directed against an inner surface of said bag instead of a seam of said seamed end.

26. A method of interconnecting at least two tubular geotextile bags of the type having an inner cavity for maintaining fill material, said method comprising the steps of:

(a) folding a closed end of a first bag back into a respective inner cavity thereof to form a pouch;

(b) placing at least one anchor object into a respective inner cavity of a second bag;

(c) inserting said anchor object with a portion of the second bag on an outside thereof into said pouch such that a remaining portion of said second bag will extend from said pouch;

(d) situating a clamping mechanism about a neck portion of said pouch in said respective inner cavity of said first bag; and (e) tightening said clamping mechanism to close said pouch and tie off said anchor object such that said anchor object is maintained therein, whereby said first bag and said second bag will be interconnected.

27. A method as set forth in claim 26, further comprising the step of inserting the fill material into the respective inner cavities of each of said first bag and said second bag.

28. A method of interconnecting at least two tubular geotextile bags of the type having an inner cavity for maintaining fill material, said method comprising the steps of:

(a) folding a closed end of a first bag back into a respective inner cavity thereof to form a first pouch;

(b) folding a closed end of a second bag back into a respective inner cavity thereof to form a second pouch;

(c) providing an interconnecting member having at least one first anchor object and at least one second anchor object at respective opposite ends thereof;

(d) inserting said first anchor object into said first pouch;

(e) situating a clamping mechanism about a neck portion of said first pouch in said respective inner cavity of said first bag;

(f) tightening said first clamping mechanism to close said first pouch and tie off said first anchor object such that said first anchor object is maintained therein;

(g) inserting said second anchor object into said second pouch;

(h) situating a clamping mechanism about a neck portion of said second pouch in said respective inner cavity of said second bag; and (i) tightening said second clamping mechanism to close said second pouch and tie off said second anchor object such that said second anchor object is maintained therein;

whereby said first bag and said second bag will be interconnected.

29. A method as set forth in claim 28, further comprising the step of inserting the fill material into said respective inner cavities of each of said first bag and said second bag.

* * * * *